K. GOLDSCHMIDT & F. SPITZER.
PROCESS OF MANUFACTURING ANHYDRIDS OF FATTY ACIDS.
APPLICATION FILED OCT. 29, 1909.
1,195,205.
Patented Aug. 22, 1916.
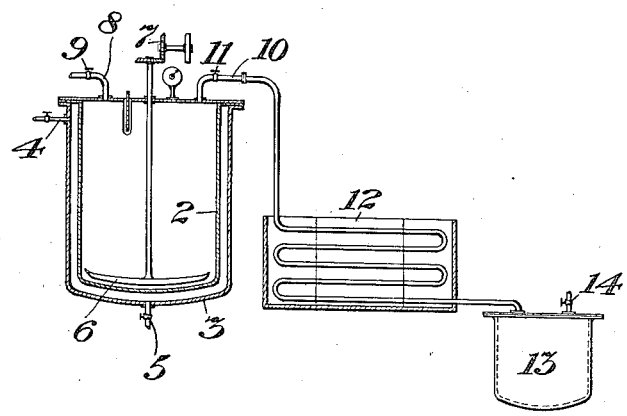
Witnesses:
Chas. F. Clagett
K. M. Cassidy.
Inventors,
Karl Goldschmidt
and Fritz Spitzer
by Chas. F. Dane
Attorney

UNITED STATES PATENT OFFICE.

KARL GOLDSCHMIDT AND FRITZ SPITZER, OF ESSEN-ON-THE-RUHR, GERMANY, ASSIGNORS, BY MESNE ASSIGNMENTS, TO GENERAL CHEMICAL COMPANY, OF NEW YORK, N. Y., A CORPORATION OF NEW YORK.

PROCESS OF MANUFACTURING ANHYDRIDS OF FATTY ACIDS.

1,195,205.     Specification of Letters Patent.     Patented Aug. 22, 1916.

Application filed October 29, 1909. Serial No. 525,266.

*To all whom it may concern:*

Be it known that we, KARL GOLDSCHMIDT, subject of the King of Prussia, German Emperor, and FRITZ SPITZER, subject of the Emperor of Austria-Hungary, and both residents of Essen-on-the-Ruhr, in the German Empire, have invented a new and useful Process of Manufacturing Anhydrids of Fatty Acids, of which the following is an exact specification.

This invention relates to a process of manufacturing anhydrids of fatty acids, especially acetic anhydrid, from a fatty acid salt or from a mixture of salts of the same fatty acid.

It has heretofore been proposed to manufacture fatty acid anhydrids by heating the fatty acid salts with chlorid of sulfur. The manufacture of this chlorid of sulfur ($SCl_2$) has proved, however, to be very troublesome and expensive. We have found that the manufacture of such chlorid of sulfur may be avoided and the whole process carried out with much less trouble, by mixing the fatty acid salt or salts in a dry state with powder of sulfur or flowers of sulfur and acting on such mixture with dry chlorin. Experiments have shown that the process is advantageously carried out at a low temperature. Good results have been obtained by taking the materials, for example, in the proportions of about 8 molecules of acetate (of a monobasic metal) to 1 atom of sulfur, but these proportions are not essential. The reaction being finished, say at a low temperature, the product obtained by the reaction may be moderately heated for some time, in order to transform any fatty acid chlorid which may still be present into anhydrid, after which it is distilled eventually under *vacuo* in a manner well understood.

In the drawing we have illustrated an apparatus suitable for use in carrying out our present process.

Referring to said drawing, 2 designates a tightly closed reaction chamber or vessel into which the mixture to be acted upon has been introduced. This vessel usually has a jacket, such as 3, to permit the circulation of a cooling medium around the reaction vessel in contact with the walls thereof. Suitable means are illustrated at 4 and 5 for introducing the cooling medium and permitting its escape when it reaches the bottom of the jacket. A stirrer or means for keeping in motion the substances forming the charge is illustrated at 6. It may be operated by suitable mechanism, such as that shown at 7. The chlorin employed, which should be in a dry state, may be admitted at 8 and its flow regulated or varied as desired, as by means of a valve 9. The anhydrid resulting from the reaction will in this case leave the reaction vessel through a pipe 10, which may also have a valve 11 therein by means of which communication with the reaction vessel may be made or cut off, as required. The pipe 10 leads to the coils of a condenser 12 in which the anhydrid distilled over from the reaction vessel 2 is condensed, and from which the liquid distilled passes to a receiving vessel 13.

In order to make clear the manner in which this process is practised, the following is given as one example: In the reaction vessel, such as 2, 328 kilograms of carefully dried sodium acetate are mixed with at least 16 kilograms of sulfur or flowers of sulfur, a certain amount of acetic anhydrid being added to the mixture. The vessel 2 is then tightly closed and a cooling medium introduced at 4 and the mixture cooled down to, say, $-15°$ C. While this cooling action is taking place the mixture is thoroughly stirred by the device 6 and dry chlorin is also introduced. If desired the reaction vessel may be exhausted before introducing the chlorin. The introduction of the chlorin is so regulated that in, say, five hours $106\frac{1}{2}$ kilograms will have entered the reaction vessel. The chlorin admitted is quickly taken up by the mixture and the pressure prevailing in the chamber 2 at the end of the reaction usually exceeds that at the beginning by only about one-tenth of an atmosphere. When the calculated amount of chlorin has been introduced the product in the reaction vessel is subjected to slow and moderate heating in order to transform the acetyl chlorid still present into acetic anhydrid, after which the heating is continued to distil the liquid anhydrid. The vapors of acetic anhydrid are led through the pipe 10 to the condenser, from which the distilled liquid passes to the receiving vessel 13, which is connected with a vacuum-pump (not shown), as for example by the connections shown at 14. The mass in the reaction vessel is preferably stirred both during reaction and during the subsequent distillation. It is advisable to hold a high vacuum during distillation, as it is only with the highest degree of vacuum that the output of anhydrid will be approximately the theoretical one, *i. e.*, 204 kilograms.

We are not able to state with absolute exactness the chemical reaction involved in the process just described, but we consider it highly probable that it takes place substantially according to the following reaction:

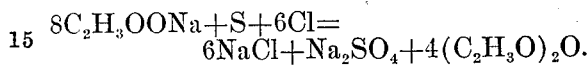
$$8C_2H_3OONa + S + 6Cl = 6NaCl + Na_2SO_4 + 4(C_2H_3O)_2O.$$

The acetate of sodium may be replaced wholly or partly by another salt, as for instance acetate of calcium.

The sulfur cited in the above specification may be replaced wholly or partly by metallic sulfids for instance sulfid of iron (pyrite) or other sulfur containing metallic compounds, said sulfur containing bodies being considered by us as equivalents of the sulfur.

What we claim is:

1. A process for the production of fatty acid anhydrids, which consists in mixing a fatty acid salt with sulfur, and treating the mixture at a low temperature with chlorin.

2. A process for the production of fatty acid anhydrids, which consists in mixing a fatty acid salt with sulfur, both being in a dry state, and treating the mixture at a low temperature with dry chlorin.

3. A process for the production of acetic anhydrid, which consists in mixing an acetate with sulfur, both being in a dry state, and treating the mixture at a low temperature with dry chlorin.

4. A process for the production of acetic anhydrid which consists in mixing sodium acetate and sulfur, both being in a dry state, and treating the mixture at a low temperature with chlorin.

5. A process for the production of fatty acid anhydrids, which consists in mixing a fatty acid salt with sulfur, treating the mixture at a low temperature with chlorin, and stirring said mixture while it is under treatment.

6. A process for the production of fatty acid anhydrids, which consists in mixing a fatty acid salt with sulfur, treating the mixture at a low temperature with chlorin, and after the supply of chlorin has been cut off moderately raising the temperature of the mixture for a considerable period of time.

7. A process for the production of fatty acid anyhydrids which consists in mixing a fatty acid salt with sulfur, both being in a dry state, treating the mixture at a low temperature with dry chlorin and after the supply of chlorin has been cut off moderately raising the temperature of the mixture for a considerable period of time.

8. A process for the production of fatty acid anhydrids, which consists in mixing a fatty acid salt with a sulfur-containing reagent and treating the mixture at a low temperature with chlorin.

9. A process for the production of fatty acid anhydrids, which consists in mixing a fatty acid salt with a sulfur-containing reagent, both being in a dry state, and treating the mixture at a low temperature with dry chlorin.

10. A process for the production of acetic anhydrid, which consists in mixing an acetate with a sulfur-containing reagent, both being in a dry state, and treating the mixture at a low temperature with dry chlorin.

11. A process for the production of acetic anhydrid, which consists in mixing sodium acetate and a sulfur-containing reagent, both being in a dry state, and treating the mixture at a low temperature with chlorin.

In testimony whereof we have hereunto set our hands in presence of two subscribing witnesses.

KARL GOLDSCHMIDT. [L. S.]

Witnesses:
   Evans Hirschland,
   E. T. Roeber.

Dr. FRITZ SPITZER. [L. S.]

Witnesses:
   Chas. J. Wright,
   Otto König.